(12) United States Patent
Faretra

(10) Patent No.: US 8,714,002 B2
(45) Date of Patent: May 6, 2014

(54) DEVICE FOR MONITORING THE STATE OF RADIAL DEFORMATION OF A TYRE

(75) Inventor: Marco Faretra, Longiano (IT)

(73) Assignee: Barbalab S.r.l., Casalecchio di Reno (IT)

( * ) Notice: Subject to any disclaimer, the term of this patent is extended or adjusted under 35 U.S.C. 154(b) by 0 days.

(21) Appl. No.: 13/980,246

(22) PCT Filed: Jan. 18, 2011

(86) PCT No.: PCT/IT2011/000015
§ 371 (c)(1),
(2), (4) Date: Jul. 17, 2013

(87) PCT Pub. No.: WO2012/098566
PCT Pub. Date: Jul. 26, 2012

(65) Prior Publication Data
US 2013/0299007 A1 Nov. 14, 2013

(51) Int. Cl.
*B60C 23/02* (2006.01)
*B60C 23/06* (2006.01)

(52) U.S. Cl.
CPC ............... *B60C 23/06* (2013.01); *B60C 23/064* (2013.01)
USPC ........................................ 73/146.2; 340/445

(58) Field of Classification Search
CPC ............ B60C 23/0408; B60C 23/0401; B60C 23/0416; B60C 23/00; B60C 23/0406; B60C 23/043; B60C 23/048; B60C 23/093; B60C 23/494; B60C 11/24; B60C 19/00; B60C 23/003; B60C 23/004; B60C 23/02; G01M 17/02; G01M 17/022
See application file for complete search history.

(56) References Cited

U.S. PATENT DOCUMENTS

| | | | |
|---|---|---|---|
| 4,254,312 A | 3/1981 | Migrin et al. | |
| 7,089,147 B1 | 8/2006 | Chang | |
| 2001/0023613 A1 | 9/2001 | Lemberger et al. | |
| 2002/0078741 A1* | 6/2002 | Cantu et al. | 73/146 |
| 2003/0046992 A1* | 3/2003 | Caretta | 73/146 |
| 2003/0154779 A1* | 8/2003 | Polenghi | 73/146.8 |
| 2007/0193349 A1 | 8/2007 | Petrucelli | |
| 2008/0282965 A1* | 11/2008 | Crano | 116/34 R |
| 2009/0071238 A1* | 3/2009 | Crano et al. | 73/146.5 |
| 2010/0083767 A1 | 4/2010 | Kurtz et al. | |
| 2011/0272038 A1* | 11/2011 | Falkenborg | 137/224 |
| 2012/0235809 A1* | 9/2012 | Cantarelli et al. | 340/445 |
| 2012/0274461 A1* | 11/2012 | Colombo et al. | 340/447 |
| 2012/0312389 A1* | 12/2012 | Kempf | 137/227 |

FOREIGN PATENT DOCUMENTS

| | | |
|---|---|---|
| IT | 0001337026 | 12/2002 |
| IT | 0001337027 | 12/2002 |
| IT | 0001337028 | 12/2002 |
| IT | 0001337035 | 12/2002 |
| IT | BO20090464 A | 1/2011 |

OTHER PUBLICATIONS

English-language abstract of Italian Patent No. 0001337026, Dec. 12, 2002.
English-language abstract of Italian Patent No. 0001337027, Dec. 12, 2002.
English-language abstract of Italian Patent No. 0001337028, Dec. 12, 2002.
English-language abstract of Italian Patent No. 0001337035, Dec. 16, 2002.
English-language abstract of Italian Patent Publication No. BO20090464A, Jan. 22, 2011.

\* cited by examiner

*Primary Examiner* — Andre Allen
(74) *Attorney, Agent, or Firm* — DASCENZO Intellectual Property Law, P.C.

(57) ABSTRACT

Described is a device (51) for monitoring the state of inflation of vehicle wheel tires, the wheels comprising a rim (100) and a respective tire (101) delimiting a hollow space (103) inside the wheel from the outside environment (104). The device (51) comprises: a first end (53) equipped with a self-closing valve connectable to means for inflating and deflating the tire (101); a second end (99) sealingly connectable on a hole (102) in the rim (100) of the wheel; a cavity (62) interposed between the two ends (53) and (99) and sealingly delimited by a wall (81) which is integral with a body (52) of the device and by an elastically deformable partition (203) having an inside face subjected to the pressure inside the tire and an outside face subjected to the atmospheric pressure of the outside environment; means (221) for generating and transmitting electromagnetic signals and a power source (215); a switch (208) mounted in the cavity (62) and configured to drive the means (221) for generating and transmitting electromagnetic signals, where the deformable partition (203) comprises a contact element (222) operating on the switch (208) in such a way as to activate it in response to a deformation of the partition (203) itself. The device is adapted to be mounted in place of the inflation valve of a vehicle wheel tire in order to provide the driver of the vehicle with indications about the state of radial deformation of the tire, without increasing dimensions and weight compared to the original valve and without creating obstacles to fitting and removing the tire.

20 Claims, 10 Drawing Sheets

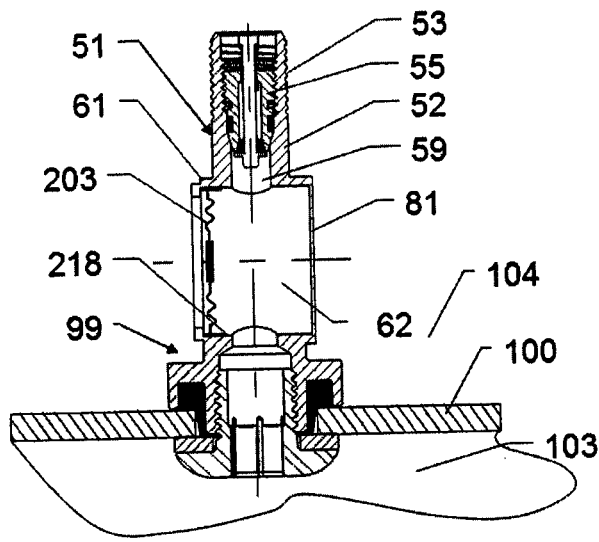
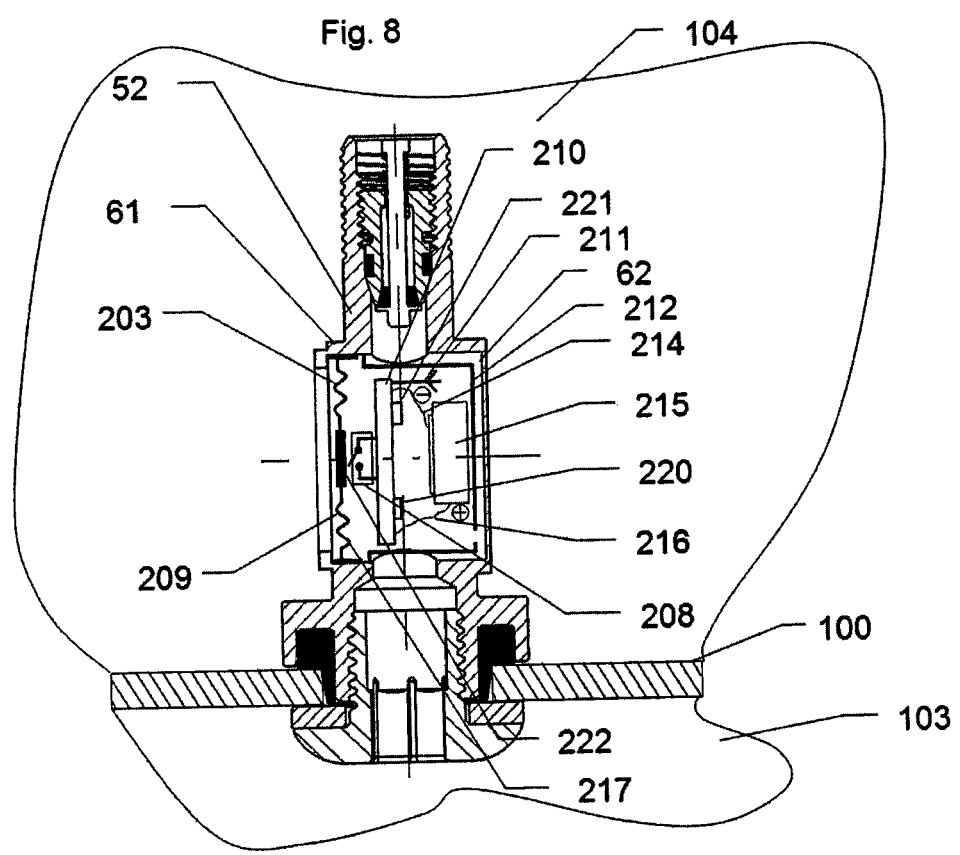

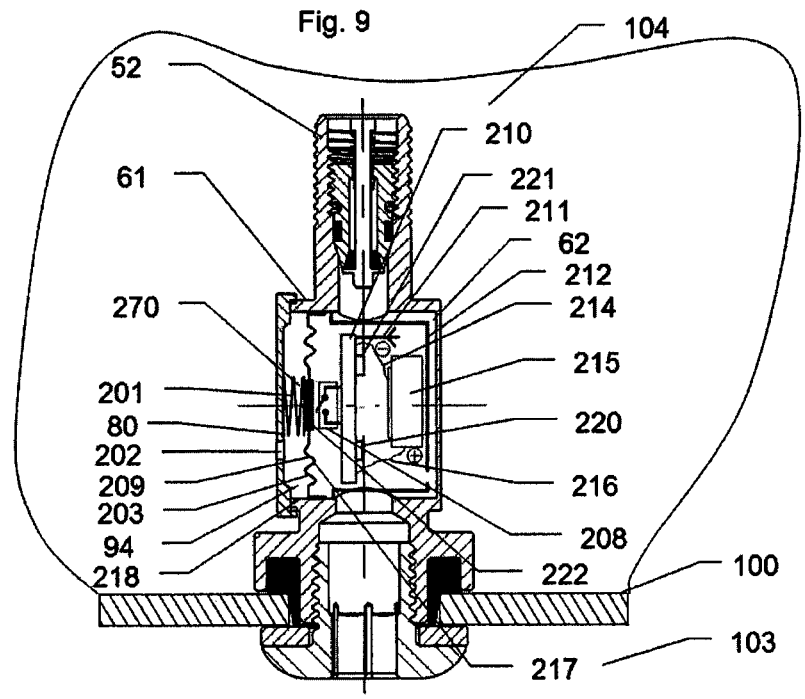
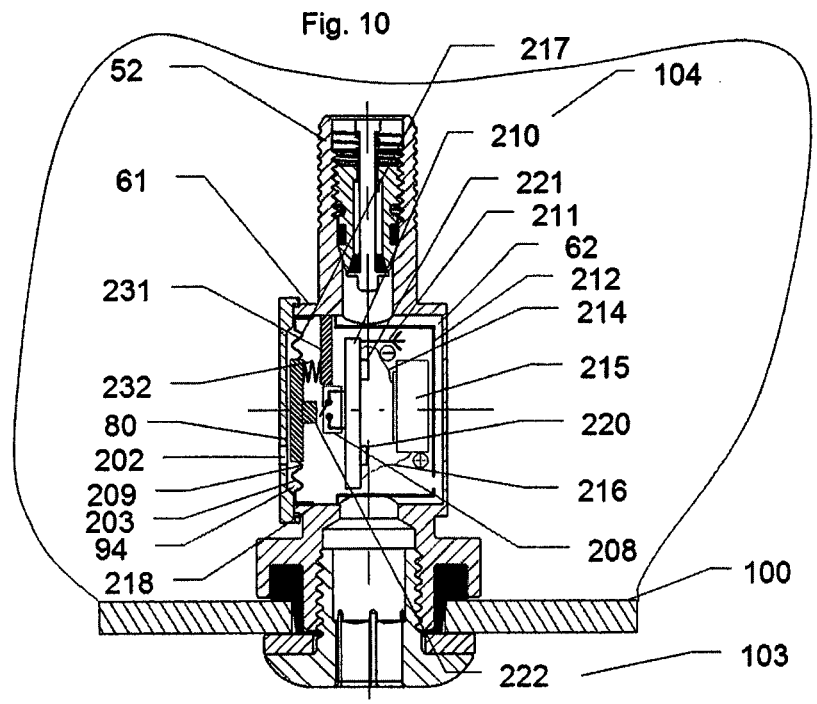

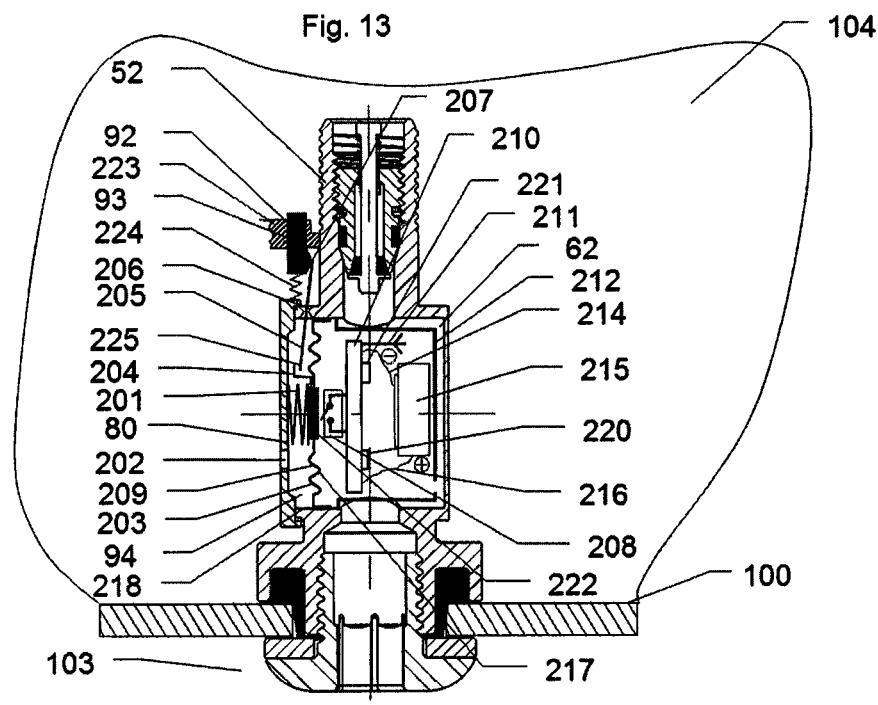
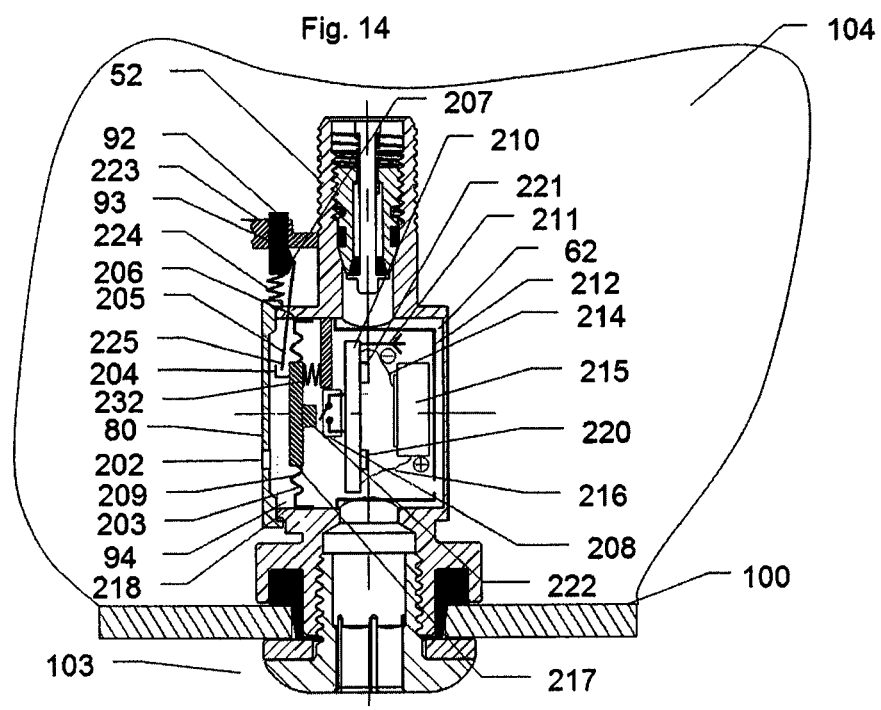

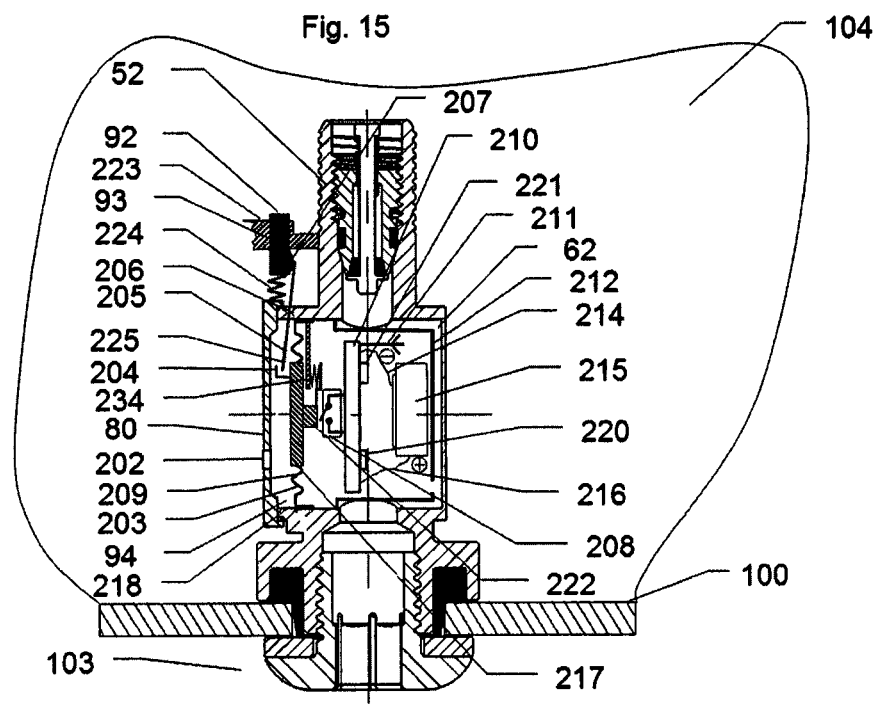
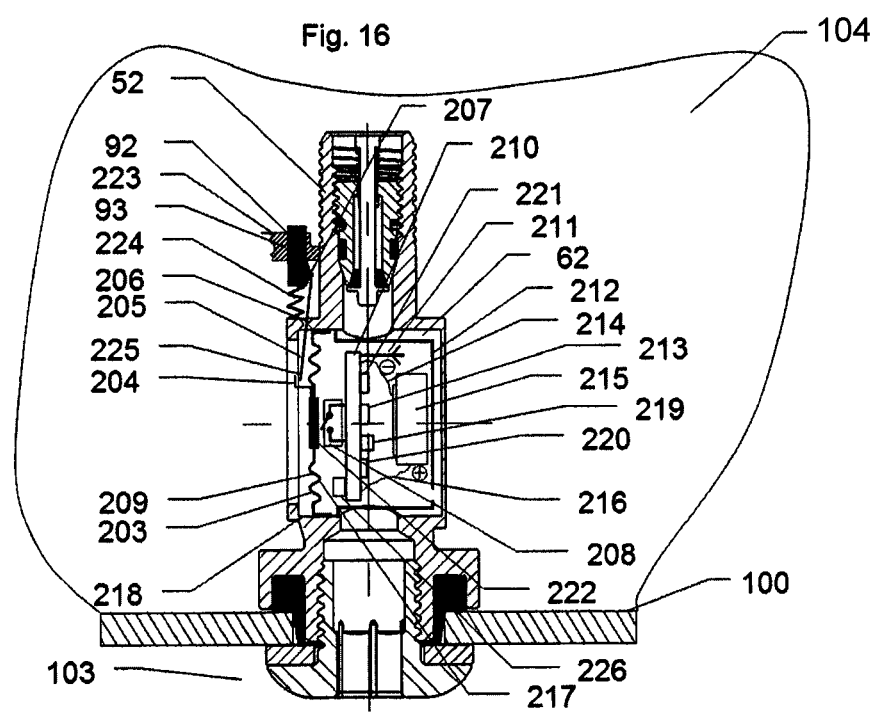

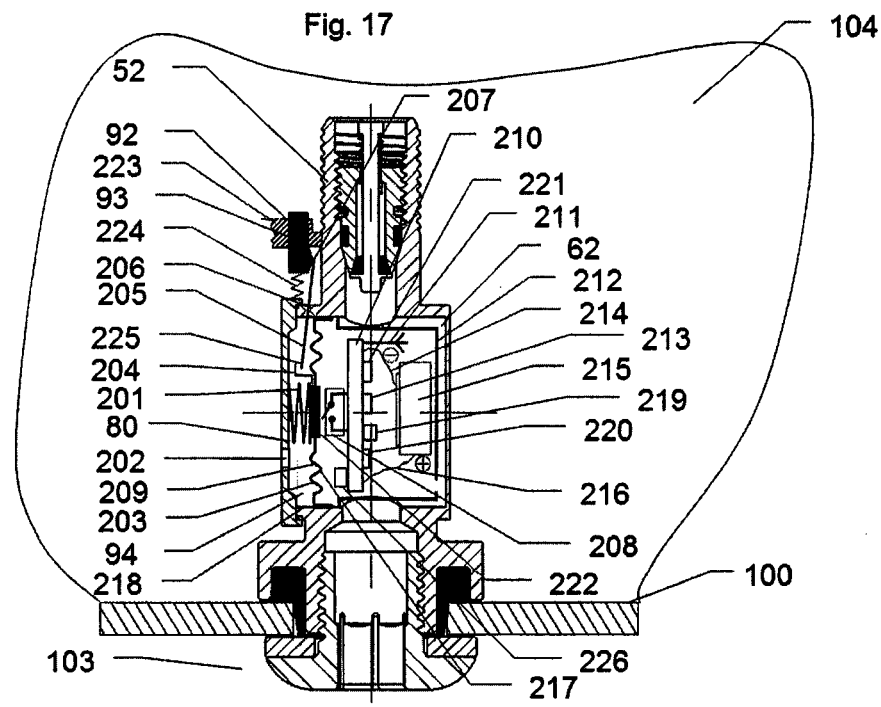
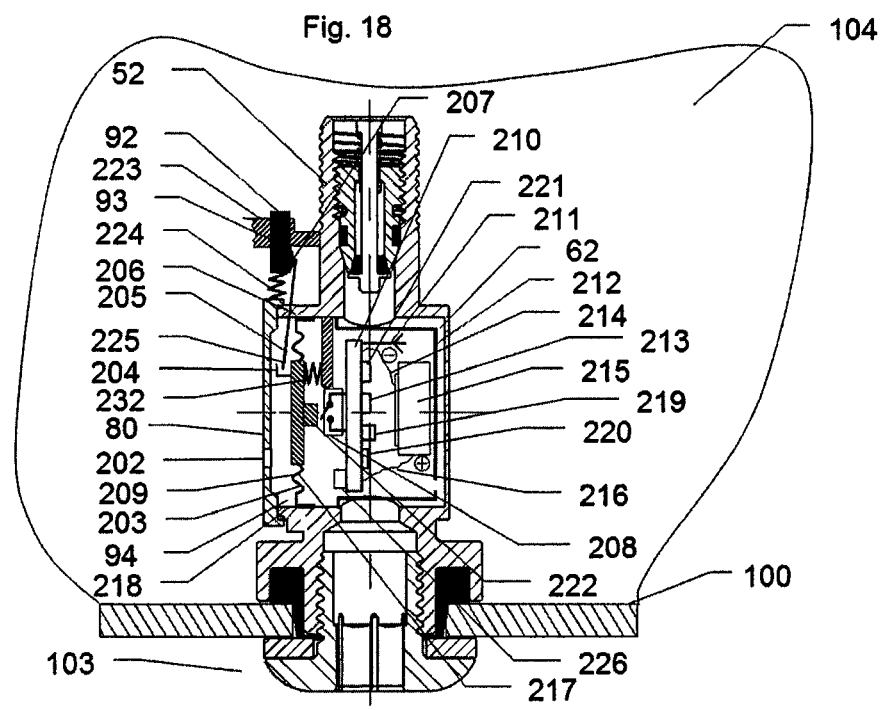

DEVICE FOR MONITORING THE STATE OF RADIAL DEFORMATION OF A TYRE

TECHNICAL FIELD

This invention relates to a device for monitoring the radial deformation of a tyre.

The invention pertains to the technical field of radial deformation monitoring of vehicle wheel tyres.

BACKGROUND ART

Reference is made herein to tyres fitted to the wheels of different types of vehicles (motor cars, trucks, motorcycles, etc.).

The functional characteristics of a tyre depend on its state of radial deformation (flattening towards the ground under load) and affect the dynamic behaviour of the vehicle.

Monitoring the state of radial deformation of vehicle tyres concerns what has become a priority issue in the modern-day automotive trade, and that is, vehicle roadworthiness and safety (correctly inflated tyres allow better control, better road grip and optimized braking distances) but not only that. It also regards the key issues of energy saving and pollution: correctly inflated tyres allow major savings not only in terms of longer tyre life but also in terms of lower fuel consumption (since rolling friction is reduced). That in turn means less pollution due to vehicle emissions which can be reduced by many percentage points.

This must be viewed against an actual setting where motorists the world over seem to care very little about the state of wear of the tyres of their vehicles: statistics indicate that 90% of the vehicles currently in circulation worldwide have insufficiently inflated tyres and that in 50% of these, tyre pressure is below the limit for correct use (approximately 25% less than the nominal tyre pressure).

The main reason is that tyres are subject to a slow but inexorable loss of pressure due to the natural molecular migration of gas through the tyres walls.

It should be noted that a tyre underinflated by 20% of its nominal pressure is the cause of higher fuel consumption and hence higher exhaust gas pollution (approximately 3%) and has a working life reduced by 30%, with a corresponding increase in pollution due to harmful particulates (from tyre wear) and higher costs for the vehicle owner.

If the social costs arising out of accidents due to the use of vehicles with underinflated tyres are added to this, it is clear that research for effective and easy to use devices for monitoring the state of radial deformation of tyres is a key factor in the future development of the industry.

The state of radial deformation of a tyre under load is proportional to the difference between the pressure of the gas inside the tyre and the atmospheric pressure of the environment outside it. This is also known as state of tyre inflation.

Thus, correct monitoring of the state of radial deformation of the tyre inevitably implies measuring the absolute pressure inside the tyre and the pressure of the atmosphere outside it.

In light of this, TPMS is the acronym for Tyre Pressure Monitoring System.

Research in industrial applications in this field has been in progress for several decades but, owing to the complexity of the subject, the first significant applications have been brought out only in the last few years, thanks also to United States federal legislation which has made it compulsory to install TPMS on new vehicles.

Today, TPMS are one of the most important and promising fields of the automotive sector and, more generally, of the transport vehicle sector. Given the size of the vehicle market, in terms of quantities and turnover, it may be considered one of the most important business opportunities of the present and at least for the next ten to fifteen years.

All the major companies in the automotive industry and in the industry of automotive components are competing to develop safe, functional and cost-effective solutions applicable on a large scale to vehicles of different kinds.

TPMS systems of both "direct" and "indirect" type have been developed. TPMS systems are said to be "direct" when they measure the pressure inside each tyre using appropriate pressure sensors, with the aid of temperature sensors, if necessary, to take into account the compressibility of the gas, while "indirect" TPMS systems infer the state of tyre inflation from the values of other measured quantities, such as, for example, rolling speed.

Direct systems are much better performing and are therefore preferred even if their cost is higher than that of indirect systems.

Generally speaking, state of the art, direct TPMS systems are equipped with pressure sensors which measure the absolute pressure inside the tyre and assume a fixed absolute value (for example 1000 mbar) for the pressure outside, and thus do not measure the radial deformation of the tyre.

Prior art TPMS systems of the direct type normally comprise a sensor unit (comprising at least one pressure sensor and, if necessary, at least one temperature sensor) associated with a unit for generating and transmitting electromagnetic signals, suitable for transmitting to the outside indications regarding the state of inflation of the tyres and equipped with power supply systems (for example batteries) to be installed on each wheel to be monitored, and at least one receiving unit for receiving the electromagnetic signals from the sensor units mounted on the wheels and providing the vehicle driver with indications.

A first prior art solution comprises modules consisting of electronic pressure sensors, associated with radio transmission apparatuses and respective antennas, to be mounted inside each tyre (or fastened either to the inside groove of the wheel rim using a metal strip, as schematically illustrated in FIG. 1, or to the protrusion inside the inflation valve, as schematically illustrated in FIG. 2).

Owing to their inherent properties, these modules are relatively large in size and weight, as described below.

Architectures which involve fitting relatively large and heavy objects inside the tyres are suitable only for original equipment applications (that is, equipment which is factory-fitted on the vehicles by the manufacturers) and are certainly not suitable for retrofitting or after market applications (that is, for fitting on vehicles currently in circulation, whose number is approximately twelve times higher than the number of new vehicles manufactured each year).

That means automatically excluding a sufficiently rapid spreading of these systems to a significant number of vehicles, thereby losing a major business opportunity (which, at best, would be limited to new vehicles only) and excluding for a long time to come the acquisition of real "social" benefits such as those that would result from reducing pollution emissions guaranteed by proper use of tyres by a significant number of motorists.

These prior art solutions, based on sensors to be installed inside the tyre, have several inherent disadvantages, which are difficult, if not impossible to eliminate. Described below are the main and most common problems encountered.

A first problem is the following.

Since tyre monitoring makes sense if it allows unsafe vehicle driving conditions to be detected in good time, the state of inflation of each tyre must be measured and signalled to the driver without delay: thus, the pressure and temperature sensors must be permanently active and cannot be disabled for long periods (in practice, they cannot be disabled for more than a few seconds). The sensors, together with the signal generating and transmission system, are the main power consumers.

For this reason, the traditional systems consume a considerable amount of power and the apparatuses provided for each tyre for measuring pressure and, if necessary, temperature are usually powered by batteries, whose size and weight constitute the main part of the systems since they must have a working life of several years.

The problems typical of these devices are the following:
a. the systems do not work in the absence of power supply;
b. the systems need a continuous supply of power;
c. if the systems are activated only for limited periods in order to save energy, the warning signal may be given with some delay after the event to be detected;
d. owing to the high number of radio signals transmitted per unit time, these systems produce a high level of electromagnetic disturbances.

Further, in most of the systems based on these architectures, the apparatuses to be mounted inside the tyres are relatively large in size and, above all, in weight, being objects of considerable volume and weighing between 20 and 40 g, due mainly to the size and weight of the batteries allowing little room for improvement in this respect. The inclusion of these objects in the tyres creates considerable problems of component adaptation from the industrial viewpoint and is therefore a source of costs but above all of risks due to the fact that wheel rotation generates a centrifugal acceleration which easily exceeds 20,000 m/s2: in these situations, a weight of 30 g translates as a force of 600 N, and unfortunately, it is not infrequent for the fastening of the apparatus to break, turning the apparatus into a bullet which may pierce the tyre and cause extremely serious and often irreparable damage.

A second problem is the following. The inclusion in the tyres of relatively large objects fastened to the rim leads to complications linked to the fitting and removal of the tyres since the objects themselves can be easily damaged or broken during such operations.

A third problem is the following. The electronic pressure sensors of these apparatuses are necessarily of the absolute type, that is to say, they are unable to measure the difference between the absolute pressure inside the tyre and the absolute atmospheric pressure outside it since they are not physically in communication with the environment outside the tyre. The static and dynamic behaviour of a tyre, on the other hand, depends on that pressure difference and not on the absolute internal pressure. It follows that the measurements performed with these apparatuses are inherently subject to error. The error may even be significant since, under equal conditions of internal pressure, the atmospheric pressure may vary by up to 30%, which means that the variations of the pressure differences may exceed 10% of the normal inflation pressures of most vehicle tyres.

In this regard, reference is made to the article presented at the SAE World Aviation Congress, Advances in Aviation Safety, Sep. 8-11, 2003, Montreal, QC, CANADA, Session: Maintenance Safety II, available from http://www.sae.org/technical/papers/2003-01-2980), entitled "Tire Monitoring Systems Design: a Novel Approach" (SAE paper n. 2003-01-2980).

Reference is also made to the paper presented at the SAE 2004 World Congress & Exhibition, Mar. 8-11, 2004, Detroit, Mich., USA, Session: Vehicle Sensors & Actuators, available as SAE publication (SAE Paper Title: "On Tire Monitoring Systems Temperature Compensation", Document Number: 2004-01-1110) from "http://www.sae.org/servlets/productDetail?PROD_TYP=PAPER &PROD_CD=2004-01-1110".

A fourth problem is the following. Architectures which involve fitting relatively heavy objects inside the tyres require dynamic rebalancing of the wheel. This is usually done with counterweights made of lead, a material which will soon be prohibited by anti-pollution regulations. To overcome this problem, in original equipment for vehicles to be fitted with the sensors, special wheel rims are manufactured with built-in weight to balance the weight of the sensor. This involves managing different rim versions (with and without sensor) for every rim design, thereby increasing costs. Moreover, these architectures are suitable only for original equipment applications and certainly do not lend themselves to retrofitting or after-market applications.

A fifth problem is the following. The systems based on these traditional architectures measure the absolute internal pressure of a tyre and, if necessary, a temperature whose real value is intermediate between the temperature of the gas inside the tyre and the temperature of other components of the wheel assembly to which the temperature is close or connected. The pressure sensor normally has a fixed value as reference pressure.

A sixth problem is the following. These sensors, usually electronic, are connected to apparatuses for processing and transmitting the data to the outside. The external receiver is connected to a processing control unit which in turn transmits a signal to a display device normally mounted on or built into the vehicle dashboard. The transmission of the signal from the apparatus fitted to each tyre to the external receiver occurs through at least one transmitting antenna and one receiving antenna. Therefore, these systems are particularly complex and expensive since they include at least one cabling.

Prior art devices of a different type are based on units to be applied to individual wheels on the outside of the tyre instead of on the inside.

More specifically, patent document US2001/0023613 discloses a tyre pressure measuring device, having a gas inside the valve, separated from the space inside the wheel by a movable wall associated with an indicator which is movable on a graduated scale to provide a reading. The gas inside is pre-loaded in such a way as to oppose the pressure inside the tyre to place the indicator in equilibrium.

Patent document WO2007/095199 discloses a tyre pressure gauge comprising a pressure sensor located inside the valve and a display to provide a visible indication of the pressure measured by the sensor.

These systems, however, are not practical to read and do not provide the vehicle driver with timely indications (that is to say, the driver must take the trouble of going to read them, involving the inconvenience of having to take periodic readings, even in situations where tyres are correctly inflated).

In particular, the devices of this kind include devices which can be screwed onto the inflation valves in place of the valve cap and some of which are much smaller in size and weight than the traditional apparatuses described above (it is not even necessary to re-balance the wheels after installing the devices). These devices therefore solve in whole or in part some of the problems described above (FIG. 3).

Since they are easy to access, however, these devices are also easy to steal and must therefore be provided with anti-theft systems, meaning that they can be removed from the valve only with suitable tools.

That may make it complicated to take periodic action on the tyres to restore the correct pressure.

Further, their axial length is greater than that of the standard valve cap and that means, in some cases, that it is difficult to meet the specification requiring the valve not to protrude from the rim.

In any case, prior art devices have some drawbacks in common, as described below.

Every device to be applied to a wheel is usually composed of two or more components to be interfaced mechanically, pneumatically and electrically. For example, devices fastened to the protrusion inside the inflation valve need at least one mechanical interface and one electrical interface when they use the valve stem as an antenna, or devices fitted on the outside of the tyre in place of the valve cap need at least one mechanical interface and one pneumatic interface, and so on. As is known, each interface means higher production and assembly costs, risk of faults, and non-optimized dimensions.

In light of this, the prior art devices do not meet the need to provide a system for monitoring the state of radial deformation of a tyre which is at once not only effective and reliable but also light in weight, small in size, inexpensive and easy to use.

Aim of the Invention

This invention has for an aim to provide a device for monitoring the state of radial deformation of a tyre and which overcomes the above mentioned disadvantages of the prior art.

More specifically, the invention has or an aim to provide a device for monitoring the state of radial deformation of a tyre in a particularly efficient and timely manner.

Another aim of the invention is to provide a device which can monitor the state of radial deformation of a tyre and which is particularly simple and reliable.

These aims are fully achieved by the device according to the invention as characterized in the appended claims.

More specifically, the device according to the invention comprises a device for monitoring the state of inflation of vehicle wheel tyres, the wheels comprising a rim and a respective tyre separating a hollow space inside the wheel from the outside environment, the device comprising:

an end connectable to means for inflating and deflating the tyre, this end defining a cavity which is separated from the outside environment by a self-closing valve;

an end comprising means for sealingly fastening the device on a hole in the wheel rim;

a hollow protuberance interposed between the two ends and forming a cavity sealingly delimited by a wall which is integral with the body of the device and by a partition (that is, a membrane) which is elastically deformable and which is sealingly connected to an inside wall of the cavity, the cavity of the protuberance being in communication with the inside hollow space and with the cavity.

The device is characterized in that it comprises means for processing and transmitting information to a receiver mounted in the vehicle and housed inside the cavity of the hollow protuberance, where the means comprise a processor, a memory, means for generating and transmitting electromagnetic signals, a power source, a switch configured to open and close at least one electrical contact for driving the means for generating and transmitting electromagnetic signals, and a contact element associated with the elastically deformable partition to activate the switch in response to a deformation of the partition itself.

More specifically, the device according to the invention comprises:

a first end equipped with a self-closing valve connectable to means for inflating and deflating the tyre;

a second end sealingly connectable on a hole in the rim of the wheel;

a cavity interposed between the two ends and sealingly delimited by a wall which is integral with a body of the device and by an elastically deformable partition having an inside face subjected to the pressure inside the tyre and an outside face subjected to the pressure of the outside environment, characterized in that it comprises:

means for generating and transmitting electromagnetic signals and a power source;

a switch mounted in the cavity and configured to drive the means for generating and transmitting electromagnetic signals, where the elastically deformable partition comprises a contact element which operates on the switch to activate it in response to a deformation of the partition itself.

Preferably, the device also comprises a wall integral with the body of the device and interposed between the elastically deformable partition and the outside environment to define a hollow space between the wall and the elastically deformable partition and in communication with the outside environment. This wall protects the deformable partition.

Preferably, the device comprises an elastic element connected to the elastically deformable partition to apply a predetermined force opposing the pressure applied to the partition and resulting from the difference between the pressure inside the tyre and the atmospheric pressure of the outside environment.

A first end of the elastic element is connected to the elastically deformable partition and is preferably connected to the elastically deformable partition at the contact element.

A second end of the elastic element may be connected to the protective wall (in this case, the elastic element works preferably by compression, but a configuration such that the elastic element works by traction might also be chosen).

Alternatively, the elastic element (in particular, the second end of it) may be connected to a wall or protrusion located inside the cavity in the zone where the pressure is that of the tyre (in this case, the elastic element woks by traction).

Alternatively, the elastic element might be located inside the zone where the pressure is that of the tyre and the ends of it might be connected to respective protrusions formed by the elastically deformable partition and by the body of the device, respectively, so that the elastic element works by compression.

Preferably, the elastic element is made of an elastic material with non-linear properties and is configured to trigger an elastic action when the force applied to it reaches a predetermined value, whereby the switch, in combination with the partition, forms a mechanical switch of the open/closed type.

Preferably, the elastic element is a Belleville or disc spring (with non-linear property).

Preferably, the elastic element is made from bimetallic material.

This advantageously makes it possible to compensate for temperature variations, reducing the risk of false alarms from the device.

In effect, the device constitutes a mechanical sensor (consisting of the deformable partition in combination with the switch), sensitive to a non-equilibrium pressure, that is, the pressure difference between the pressure inside the tyre and the atmospheric pressure of the outside environment. The elastically deformable partition is held in equilibrium by the elastic element connected to the partition (or by the elasticity of the partition itself).

The pressure inside the tyre changes according to the temperature of the environment surrounding the wheel, whilst the pressure outside (atmospheric) is substantially independent of the temperature.

This might cause unwanted activation of the mechanical sensor if a non-equilibrium pressure applied to the partition exceeds a predetermined value not on account of air loss from the tyre but on account of a fall in temperature.

The use of bimetallic material (for the elastic element and/or for the deformable partition itself) solves this problem since it enables the mechanical sensor to adapt automatically to the temperature variations (because the non-equilibrium pressure itself becomes a function of the temperature).

Preferably, the device comprises a control element (for example, a pushbutton) configured to move the deformable partition back to the equilibrium position preceding an elastic trigger action due to the pressure inside the tyre falling below a predetermined value.

Preferably, the control element comprises a slider movable between limit positions and accessible from the outside of the device so it can be moved, the slider being operatively connected to the elastically deformable partition to cause the latter to move towards the outside environment in response to a movement of the slider.

Preferably, the device comprises an accelerometer, inside the cavity, in combination with a pressure sensor and/or a temperature sensor.

The purpose of the accelerometer is to provide information useful to understand whether the wheel the device is associated with is moving (when the means for generating electromagnetic signals issue their signal) and in what direction, in order to distinguish possible false alarms from the information supplied by the pressure and/or temperature sensor.

It should be noted that according to the invention, this information is transmitted to a receiver mounted inside the vehicle only when the mechanical sensor (formed by the deformable partition and by the switch) is activated.

Preferably, the elastically deformable partition is also made from bimetallic material.

Preferably, the switch is of the normally open contact type, so that the movement of the partition in response to a reduction in tyre pressure below a predetermined value causes the switch contact to close, thereby driving the means for generating and transmitting electromagnetic signals.

Preferably, the body of the device is made from polymeric material to avoid interferences with the means for generating and transmitting electromagnetic signals and to make the device particularly light.

Preferably, the device comprises a protective non-sealing partition located inside the cavity to protect the electronic components inside the cavity from direct gas flows during tyre inflation, while maintaining inside the cavity the same pressure as the pressure inside the tyre.

Preferably, the body of the device is shaped in such a way that the axis of its first end and the axis of its second end make an angle α different from zero (preferably between 30 and 90 degrees).

The purpose of this angled shape is to reduce overall dimensions and to reduce the stress caused by the centrifugal force the device is subjected to while the motor vehicle the device is mounted on is travelling.

The device according to the invention thus achieves the set aim since it allows falls in tyre pressure (under-inflation) to be detected and signalled quickly and automatically by activating a transmitter through a contact driven by a membrane which is movable according to the difference in pressure between the inside of the tyre and the environment outside it.

Further, the device is also extremely simple, reliable and economical, since the indicator is activated by a mechanical system that triggers a simple electric switch.

Thus, the invention solves the problem of providing a device to be fitted in place of the inflation valve of a tubeless tyre of a vehicle wheel to give the vehicle driver, through at least one receiver and at least one display, indications about the state of radial deformation of the tyre, without increasing dimensions and weight compared to the original valve and without creating obstacles to fitting and removing the tyre.

The device according to the invention therefore has the following advantages:
- its weight and dimensions are small enough to not require balancing, which means that the wheels do not need to have balancing weights applied to them, thus avoiding use and dispersal of dangerous materials;
- it does not include any structure inside the tyre other than the normal valve fastening base, so as not to create problems or obstacles to fitting and removing the tyre;
- it can take into account the relative inflation pressure;
- it cannot be easily removed or stolen;
- it does not require special tools to access the extremity of the inflation valve, making it easy to restore correct tyre pressure;
- it does not increase the axial dimensions of the valve unit;
- its power consumption is low enough to guarantee a working life whose length is compatible with market demands;
- the signals it transmits do not produce excessive electromagnetic disturbances;
- it may be installed on any type of wheel rim for any vehicle by simply substituting it for the normal inflation valve, without varying the dimensions, which means the solution is applicable on a large scale even for after market applications.

More in detail, it is specified that the production of devices having the above mentioned features is based on the consideration that electronic pressure and temperature sensors, data processing equipment and signal transmission equipment, when active. consume considerable amounts of energy. With the traditional architectures, the equipment must be on all the time and thus, large and heavy, high-capacity batteries are required to guarantee long periods of operation.

In light of this, the invention allows size and weight to be significantly reduced, making them compatible with the features described above. In effect, the electronic components are activated only when required by a mechanical sensor (consisting of the membrane, or deformable partition) which is permanently active without consuming any power. This makes it possible not to penalize the timeliness of the device (which would instead be penalized by a strategy of keeping the electronic equipment inactivated for most of the time and activating it at predetermined intervals of, for example, 10 minutes, to take, process and transmit measurements).

Indeed, maximum timeliness of the device is guaranteed by a permanently active pressure sensor which does not consume energy when activated, which performs the function of monitoring the system and which, at any moment, if the radial deformation of the tyre changes, making driving conditions unsafe, immediately activates alarm signal transmission to the driver, independently of the state of the other sensors.

The permanently active pressure sensor which does not consume energy when activated may be, for example, of a mechanical type and, advantageously, may be of a mechanical threshold type, in the sense that it can activate alarm signal transmission to the driver when the pressure exceeds a predetermined threshold.

Since it is a sensor which must activate alarm signal transmission to the driver when the tyre changes to an unsafe state, that is to say, when its radial deformation exceeds a certain limit, preferably it is a sensor capable of precisely measuring not the absolute pressure inside the tyre but the relative inflation pressure, or state of inflation.

Preferably, this condition is guaranteed by the membrane in communication with the outside environment.

In light of this, the device preferably, but not necessarily, comprises an electronic pressure sensor configured to take readings at preset intervals, but not continuously. In this configuration, the function of the electronic pressure sensor (added to the permanently active mechanical one) is that of indicating to the driver average tyre pressure and temperature values to be processed over time in order to monitor the general state of the tyres, while instantaneous monitoring of safe driving conditions is performed by the permanently active sensor.

The electronic pressure sensor, need not be provided, however, and the performance of the device might, instead, be limited only to the function consisting of the continuous monitoring of the tyres to guarantee safe driving conditions.

BRIEF DESCRIPTION OF THE DRAWINGS

These and other features of the invention will become more apparent from the following detailed description of a preferred, non-limiting embodiment of it, with reference to the accompanying drawings, in which:

FIGS. 6, 7 and 8 show a device according to the invention, in cross section;

FIG. 9 shows the device of FIG. 6 according to another embodiment of the invention;

FIG. 10 shows the device of FIG. 6 according to a third embodiment of the invention;

FIG. 13 shows the device of FIG. 6 according to a sixth embodiment of the invention;

FIG. 14 shows the device of FIG. 6 according to a seventh embodiment of the invention;

FIG. 15 shows the device of FIG. 6 according to an eighth embodiment of the invention;

FIG. 16 shows the device of FIG. 6 according to a ninth embodiment of the invention;

FIG. 17 shows the device of FIG. 6 according to a tenth embodiment of the invention;

FIG. 18 shows the device of FIG. 6 according to an eleventh embodiment of the invention;

DETAILED DESCRIPTION OF THE PREFERRED EMBODIMENTS OF THE INVENTION

To start, a description of the most widespread standard tyre inflation valves and of their features is given below.

The most widespread state of the art inflation valves for tubeless tyres can be divided into two types: valves of the snap-in type with a rubber fastening structure shaped to be pressed into the wheel rim in such a way as to also provide a seal against gas leakage from inside the tyre, and valves of the clamp-in type with a metal fastening structure designed to be screwed to the wheel rim and provided with gaskets for sealing against gas leakage from inside the tyre.

Figure 1:
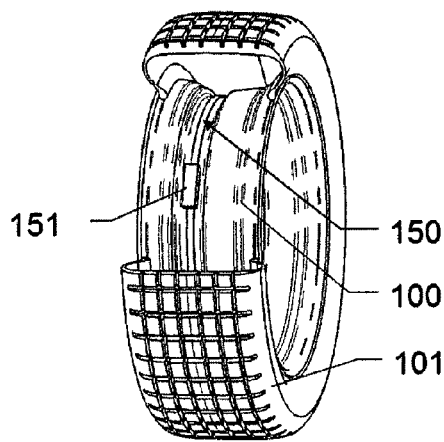
FIG. 1 shows a prior art device for monitoring the state of tyre inflation for vehicle wheels.

FIG. 1 shows the traditional TPMS architecture where an electronic pressure sensor 151, comprising radio transmission equipment and related antennas, is inserted into the tyre 101 by fastening it to a groove inside the rim 100 by a metal strip 150.

Figure 2:
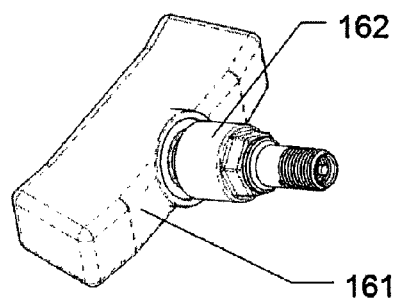
FIG. 2 shows another prior art device for monitoring the state of tyre inflation for vehicle wheels.

FIG. 2 shows the traditional TPMS architecture where an electronic pressure sensor 161, comprising radio transmission equipment and related antennas, is inserted into the tyre 162 by fastening it to the protrusion on the inside of the inflation valve.

Figure 3:
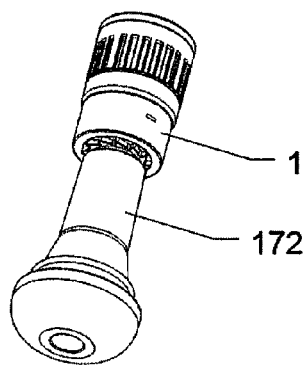
FIG. 3 shows another prior art device for monitoring the state of tyre inflation for vehicle wheels.

FIG. 3 shows the traditional TPMS architecture where an electronic pressure sensor 171, comprising radio transmission equipment and related antennas, is applied to the outside of each wheel, instead of inside the tyre, by screwing it onto the standard tyre inflation valve 172 in place of the valve cap.

Figure 4:
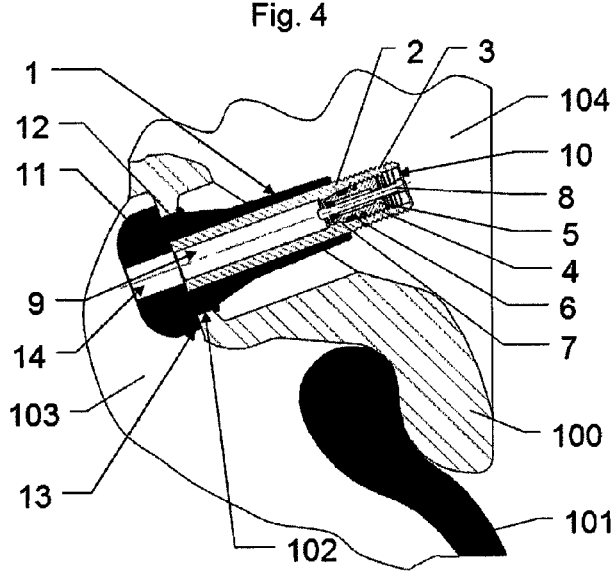
FIG. 4 shows a prior art valve of the snap-in type mounted on the rim of a wheel.

FIG. 4 shows a prior art valve 1 of the snap-in type mounted on a wheel consisting of a rim 100 and related tubeless tyre 101 of known type. The tyre delimits a hollow space 103 inside from the outside environment 104.

The rim 100 has a hole 102 suitable for insertion of the valve 1, which usually consists of a hollow stem 2, normally of metal, with an externally threaded end 3.

On the inside of the threaded end 3, the cavity of the hollow stem is provided with threading 4 suitable for fastening a self-closing needle valve 5 whose seal relative to the hollow stem 2 is guaranteed by the gasket 6. A gasket 7 provides the seal of the needle 8 relative to the valve 5. The needle 8 is held in the closed position by a customary spring, not shown in the drawing. The gasket 7 delimits a hollow stem 2 cavity 9 on the side of the hollow space 103 relative to an opening 10 on the side of the outside environment 104.

The cavity 9 is regular in shape and cross section and does not have, nor is it connected to, enlarged parts, protuberances or other cavities larger than those necessary for the passage of the gas used to inflate the tyre 101.

To inflate the tyre, a suitable inflating extremity (not illustrated in the drawing) connected to means for producing and transporting compressed gas is connected to the threaded end 3 of the hollow stem. The gas under pressure enters through the opening 10 of the hollow stem 2 and, thanks to a mechanical abutment integral with the inflating extremity and/or the pressure difference between the gas supplied through the inflating extremity and the gas inside the hollow space 103, the needle 8 of the self-closing valve 5 is opened to allow the gas under pressure to flow into the hollow space 103. To deflate the tyre 101, it is sufficient to press the needle 8 to the open position to allow the gas to escape to the outside environment 104.

When the tyre 101 is not being inflated or deflated, the opening 10 is normally protected by screwing a customary cap (not shown in the drawing) onto the threaded end 3.

The hollow stem 2 is integral with a shaped rubber covering 11 having a collar 12 adapted to be snapped into the hole 102. The collar 12 also has an enlarged head 13 for preventing the valve 1 from being pushed out of the hole 102 in the rim on account of the pressure difference between the hollow space 103 and the outside environment 104 when the tyre 101 is inflated.

The shaped covering 11 has a hole 14 in it which communicates with the cavity 9 on the inside of the hollow stem 2 relative to the gasket 7.

Figure 5:
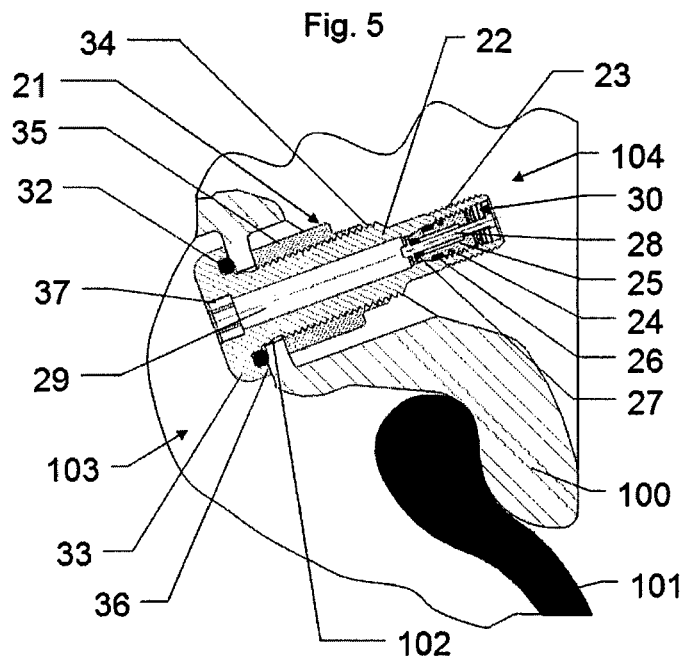
FIG. 5 shows a prior art valve of the clamp-in type mounted on the rim of a wheel.

FIG. 5 shows a prior art valve 21 of the clamp-in type mounted in the hole 102 of a rim 100 of a wheel with a tubeless tyre 101 of known type. The valve usually consists of a hollow stem 22, normally of metal, with an externally threaded end 23.

On the inside of the threaded end 23, the cavity of the hollow stem 22 is provided with threading 24 suitable for fastening a self-closing needle valve 25 whose seal relative to the hollow stem 22 is guaranteed by the gasket 26. A gasket 27 provides the seal of the needle 28 relative to the valve 25. The needle 28 is held in the closed position by a customary spring, not shown in the drawings.

The gasket 27 delimits a hollow stem 22 cavity 29 on the side of the hollow space 103 relative to an opening 30 on the side of the outside environment 104.

The cavity 29 is regular in shape and cross section and does not have, nor is it connected to, enlarged parts, protuberances or other cavities larger than those necessary for the passage of the gas used to inflate the tyre 101.

To inflate the tyre 101, a suitable inflating extremity (not illustrated in the drawing) connected to means for producing and transporting compressed gas is connected to the threaded end 23 of the hollow stem 22. The gas under pressure enters through the opening 30 of the hollow stem 22 and, thanks to a mechanical abutment integral with the inflating extremity and/or the pressure difference between the gas supplied through the inflating extremity and the gas inside the hollow space 103, the needle 28 of the self-closing valve 25 is opened to allow the gas under pressure to flow into the hollow space 103 through the conduit (i.e. duct, or air passage, or plurality of conduits or ducts or air passages) 29. To deflate the tyre 101, it is sufficient to press the needle 28 to the open position to allow the gas to escape to the outside environment 104.

When the tyre 101 is not being inflated or deflated, the opening 30 is normally protected by screwing a customary cap (not shown in the drawing) onto the threaded end 23.

At the extremity of the threading on the end 23 on the side opposite the opening 30, the hollow stem 22 has a further external threading 34 by which it engages an internally threaded element 35.

At the end of the hollow stem 22 opposite the end with the opening 30, the hollow stem 22 is integral with a head 33: one wall 36 of the head being adapted to constitute a limit stop for abutting against the wall of the rim containing the hole 102.

The head 33 has shapes and cavities suitable for housing one or more gaskets 32 designed to provide a seal against the gas under pressure contained in the hollow space 103.

After inserting the hollow stem 22 and the gasket 32 into the hole 102, the valve 21 can be sealingly fastened by screwing on and tightening the internally threaded element 35 using customary means (for example, the internally threaded element 35 has an end that is suitably shaped to be driven by a spanner).

The head 33 in turn also has customary tightening means (for example, the outside profile of the head, or the inside profile 37 of the end stretch of the hole 29 on the side of the hollow space 103 may be suitably shaped to be driven by a spanner).

Figure 6:
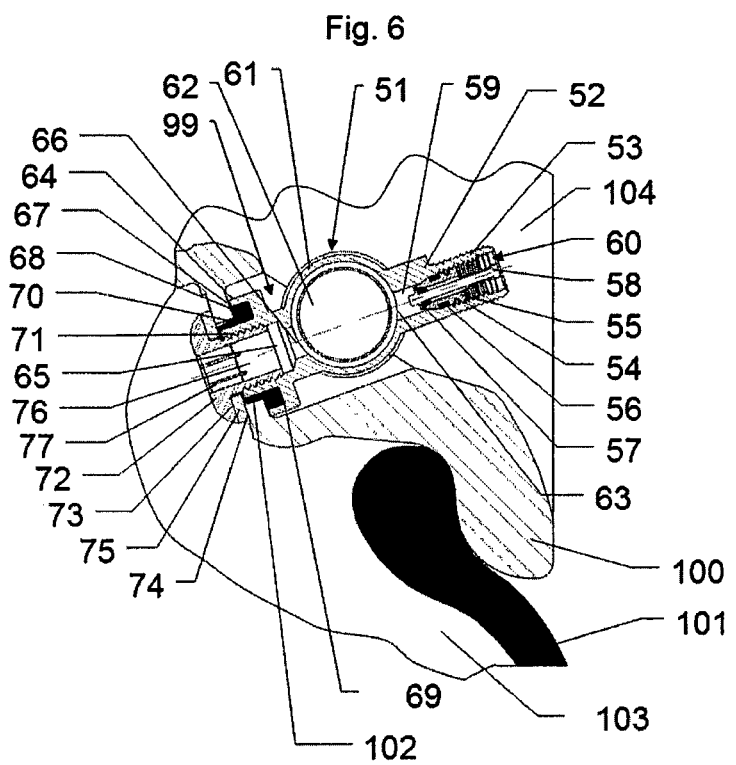

FIGS. 6, 7 and 8 show a first embodiment of the invention.

FIG. 6 shows a device 51 for monitoring the state of tyre inflation mounted in the hole 102 of a rim 100 of a wheel with a customary tubeless tyre 101 and consisting of a body 52 made preferably in one piece and being internally hollow and having, at an end of it which is distal from the hole 102, an extremity which is adapted to perform the same functions as those described above in connection with standard inflation valves.

For this purpose, the end which is distal from the hole 102 has an externally threaded end 53. On the inside of the threaded end 53, the cavity of the body 52 is provided with threading 54 suitable for fastening a self-closing valve 55 whose seal relative to the body 52 is guaranteed by a gasket 56. A gasket 57 provides the seal of a needle 58 relative to the valve 55.

The needle 58 is held in the closed position by a customary spring, not shown in the drawing. The gasket 57 delimits a cavity 59 of the body 52 on the side of the hollow space 103 relative to an opening 60 on the side of the outside environment 104.

To inflate the tyre 101, a suitable inflating extremity (not illustrated in the drawing) connected to means for producing and transporting compressed gas is connected to the threaded end 53 of the body 52. The gas under pressure enters through the opening 60 of the body 52 and, thanks to a mechanical abutment integral with the inflating extremity and/or the pressure difference between the gas supplied through the inflating extremity and the gas inside the hollow space 103, the needle 58 of the self-closing valve 55 is opened to allow the gas under pressure to flow into the hollow space 103 through the conduit 59. To deflate the tyre 101, it is sufficient to press the needle 58 to the open position to allow the gas to escape to the outside environment 104.

When the tyre 101 is not being inflated or deflated, the opening 60 is normally protected by screwing a customary cap (not shown in the drawing) onto the threaded end 53.

The above is the same as applies to the standard inflation valves described earlier on in this text.

At the extremity of the threading on the end 53 on the side opposite the opening 60, the body 52 has a hollow protuberance 61 whose cavity 62 is in communication with the cavity 59 through a conduit 63.

FIG. 7 shows the body 52, the cavity 61 and the other parts described in a section plane perpendicular to the plane of FIG. 6.

At the extremity of the hollow protuberance 61 the body 52 has an end 99 which is integral with a flange 64. The flange 64 is hollow and its cavity 65 is in communication with the cavity 62 through a conduit 66.

One wall 67 of the flange 64 is adapted to constitute a limit stop for abutting against the surface 68 formed on the rim wall containing the hole 102.

Housings 69 are formed in the flange 64 and are adapted to accommodate gaskets 70 to provide a seal against the gas under pressure inside the hollow space 103.

The cavity 65 has a hollow, internally threaded zone 71 that engages with an externally threaded element 72. The externally threaded element 72 has a head 73 adapted to be tightened on the surface 74 formed on the wall of the rim 100 containing the hole 102 on the side opposite the surface 68. A gasket 75 is interposed between the surface 74 and the head 73.

The externally threaded element 72 also has, along its entire length, a cavity 76 which places the cavity 65 in communication with the hollow space 103. That way, the cavity 62 is in communication with the hollow space 103 and the gas contained in the hollow space 103 also fills the cavity 62.

The cavity 62 of the hollow protuberance 61 is also delimited by a wall 81 which is integral with the body 52 and by an elastically deformable partition 203 sealingly connected to the inside wall 218 of the cavity 62, as shown in FIG. 7.

The elastically deformable partition 203 may be made from bimetallic material.

After inserting the body 52 and the gaskets 70 into the hole 102, the device 51 for monitoring the state of inflation of tyres can be sealingly fastened to the rim 100 by screwing on and tightening the internally threaded element 72 using customary means (for example, the internally threaded element 72 has an end that is suitably shaped to be driven by a spanner, or the inside profile 77 of the end stretch of the cavity 76 on the side of the hollow space 103 is suitably shaped to be driven by a spanner).

The shape of the hollow protuberance 61 is not necessarily cylindrical with circular section and is not necessarily centred relative to the cavity 59 or other parts of the body 52 and, more generally, of the device 51.

In FIG. 8 the hollow space 62 of the hollow protuberance 61 is adapted in shape to accommodate apparatuses for processing and transmitting information to a receiver mounted in the vehicle, not shown in the drawings.

The apparatuses comprise at least one information processing apparatus, including related memory 220, at least one apparatus 221 for generating electromagnetic signals, at least one apparatus 211 for transmitting electromagnetic signals adapted to transmit information to a receiver (not shown in the drawing), at least one power supply system 215 (for example, batteries), including related connections 214, 216, at least one support 210 for reference and connection across the apparatuses and at least one switching device 208 for opening or closing at least one electrical contact connected to the aforesaid apparatuses.

A protective non-sealing partition 212 is provided for protecting the aforesaid apparatuses from direct gas flows while the tyre 101 is being inflated, while maintaining inside the cavity 62 the same pressure as the pressure inside the hollow space 103.

One face 217 of the elastically deformable partition 203 which delimits the hollow space 62 is subjected to the pressure inside the hollow space 103 (the absolute inflation pressure of the tyre 101). This absolute pressure, when it is greater than the atmospheric pressure exerted by the outside environment, tends to deform the elastically deformable partition 203 in the direction of the outside environment 104.

The elastic reaction of the elastically deformable partition 203 opposes the deformation caused by the absolute tyre inflation pressure.

The elastically deformable partition 203 reaches a state of deformed equilibrium when the force applied to the face 217, due to the product of the absolute inflation pressure of the tyre 101 by the active surface of the elastically deformable partition 203 is in equilibrium with the force applied to the face 209 of the elastically deformable partition 203, opposite the face 217, the force applied to the face 209 being due to the product of the absolute atmospheric pressure by the active surface of the elastically deformable partition 203 plus the elastic reaction of the elastically deformable partition 203.

A contact element 222 is integral with the elastically deformable partition 203 to activate the switching device 208.

When the state of inflation of the tyre 101 is at a value greater than or equal to that for correct use of the tyre 101 itself, the state of deformed equilibrium of the elastically deformable partition 203 is such that the contact element 222 does not touch the switching device 208.

In a preferred embodiment of it, the switching device 208 is of the normally open contact type and thus, when the state of inflation of the tyre 101 is at a value greater than or equal to that for correct use of the tyre 101 itself, the contact of the switching device 208 is open.

When the state of inflation of the tyre 101 is at a value less than that for correct use of the tyre itself, the state of deformed equilibrium of the elastically deformable partition 203 is such that the contact element 222 touches the switching device 208 and the contact of the switching device 208 is closed.

FIG. 9 is in the same section plane as FIG. 7 and illustrates a second embodiment of the invention.

A rigid wall 80 is integral with the body 52. The elastically deformable partition 203, which is sealingly connected to the inside wall 218 of the cavity 62, divides the cavity 62 into two hollow spaces 62, 94. The hollow space 62 is in communication with the hollow space 103, as described above.

The conduit 202, formed on the rigid wall 80 or on the part of the wall of the protuberance 61 which encloses the hollow space 94, places the hollow space 94 in communication with the outside environment 104.

The hollow space 62 of the hollow protuberance 61 is adapted in shape to accommodate apparatuses measuring the inflation pressure of the tyre 101 and for processing and transmitting information to a receiver mounted in the vehicle, not shown in the drawings.

The apparatuses comprise at least one information processing apparatus, including related memory 220, at least one apparatus 221 for generating electromagnetic signals, at least one apparatus 211 for transmitting electromagnetic signals adapted to transmit information to a receiver (not shown in the drawing), at least one power supply system 215 (for example, batteries), including related connections 214, 216, at least one support 210 for reference and connection across the apparatuses and at least one switching device 208 for opening or closing at least one electrical contact connected to the aforesaid apparatuses.

A protective non-sealing partition 212 is provided for protecting the aforesaid apparatuses from direct gas flows while the tyre 101 is being inflated, while maintaining inside the cavity 62 the same pressure as the pressure inside the hollow space 103.

One face 217 of the elastically deformable partition 203 which delimits the hollow space 62 is subjected to the pressure inside the hollow space 103 (the absolute inflation pressure of the tyre). This absolute pressure tends to deform the partition in the direction of the hollow space 94.

At least one elastic element 201 is interposed between the wall 80 and one face 270 of the elastically deformable partition 203 and the elastic reaction of the elastic element 201 opposes the deformation of the elastically deformable partition 203 caused by the absolute tyre inflation pressure.

The elastically deformable partition 203 reaches a state of deformed equilibrium when the force applied to the face 217, due to the product of the absolute inflation pressure of the tyre by the active surface of the elastically deformable partition 203 is in equilibrium with the force applied to the face 209 of the elastically deformable partition 203, due to the product of the absolute atmospheric pressure by the active surface of the elastically deformable partition 203 plus the elastic reaction of the elastic element 201 and the elastic reaction of the elastically deformable partition 203.

A contact element 222 is integral with the elastically deformable partition 203 and is designed to activate the switching device 208.

When the state of inflation of the tyre is at a value greater than or equal to that for correct use of the tyre itself, the state of deformed equilibrium of the elastically deformable partition 203 is such that the contact element 222 does not touch the switching device 208.

In a preferred embodiment of it, the switching device 208 is of the normally open contact type and thus, when the state of inflation of the tyre 101 is at a value greater than or equal to that for correct use of the tyre itself, the contact of the switching device 208 is open.

When the state of inflation of the tyre 101 is at a value less than that for correct use of the tyre itself, the state of deformed equilibrium of the elastically deformable partition 203 is such that the contact element 222 touches the switching device 208 and the contact of the switching device 208 is closed.

FIG. 10 shows a third embodiment of the invention.

A wall 231, integral with the body 52 and formed inside the hollow space 62, acts as a support for at least one elastic element 232 that is interposed between the wall 231 and the contact element 222 that is integral with the elastically deformable partition 203 and is designed to activate the switching device 208. The connection between the elastic element 232, the wall 231 and the contact element 222 is such that the elastic element 232 can react both by compression and by traction.

According to this embodiment of the invention, the elastically deformable partition 203 reaches a state of deformed equilibrium when the force applied to the face 217, due to the product of the absolute inflation pressure of the tyre by the active surface of the elastically deformable partition 203 is in equilibrium with the force applied to the face 209 of the elastically deformable partition 203, due to the product of the absolute atmospheric pressure by the active surface of the elastically deformable partition 203 plus the elastic reaction of the elastic element 232 and the elastic reaction of the elastically deformable partition 203.

The contact element 222 is integral with the elastically deformable partition 203 and is designed to activate the switching device 208.

When the state of inflation of the tyre 101 is at a value greater than or equal to that for correct use of the tyre itself, the state of deformed equilibrium of the elastically deformable partition 203 is such that the contact element 222 does not touch the switching device 208.

In a preferred embodiment of it, the switching device 208 is of the normally open contact type and thus, when the state of inflation of the tyre 101 is at a value greater than or equal to that for correct use of the tyre itself, the contact of the switching device 208 is open.

When the state of inflation of the tyre 101 is at a value less than that for correct use of the tyre itself, the state of deformed equilibrium of the elastically deformable partition 203 is such that the contact element 222 touches the switching device 208 and the contact of the switching device 208 is closed.

Figure 11:
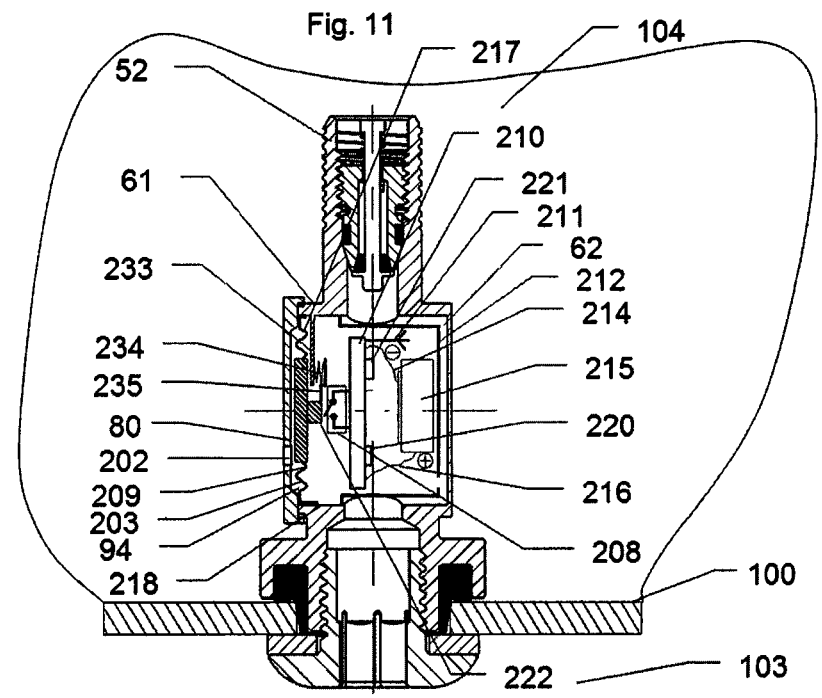
FIG. 11 shows the device of FIG. 6 according to a fourth embodiment of the invention.

FIG. 11 shows a fourth embodiment of the invention.

A wall 233, integral with the body 52 and formed inside the hollow space 62, acts as a support for at least one elastic element 234 that is interposed between the wall 231 and an undercut element 235 that is integral with the contact element 222 that is in turn integral with the elastically deformable partition 203 and designed to activate the switching device 208.

According to this embodiment of the invention, the elastically deformable partition 203 reaches a state of deformed equilibrium when the force applied to the face 217, due to the product of the absolute inflation pressure of the tyre by the active surface of the elastically deformable partition 203 is in equilibrium with the force applied to the face 209 of the elastically deformable partition 203, due to the product of the absolute atmospheric pressure by the active surface of the elastically deformable partition 203 plus the elastic reaction of the elastic element 234 and the elastic reaction of the elastically deformable partition 203.

The contact element 222 is integral with the elastically deformable partition 203 and is designed to activate the switching device 208.

When the state of inflation of the tyre 101 is at a value greater than or equal to that for correct use of the tyre itself, the state of deformed equilibrium of the elastically deformable partition 203 is such that the contact element 222 does not touch the switching device 208.

In a preferred embodiment of it, the switching device 208 is of the normally open contact type and thus, when the state of inflation of the tyre 101 is at a value greater than or equal to that for correct use of the tyre itself, the contact of the switching device 208 is open.

When the state of inflation of the tyre is at a value less than that for correct use of the tyre itself, the state of deformed equilibrium of the elastically deformable partition 203 is such that the contact element 222 touches the switching device 208 and the contact of the switching device 208 is closed.

In a preferred embodiment the elastic element 234 is a disc spring.

In another preferred embodiment the elastic element 234 is a disc spring made of bimetallic material.

Figure 12:
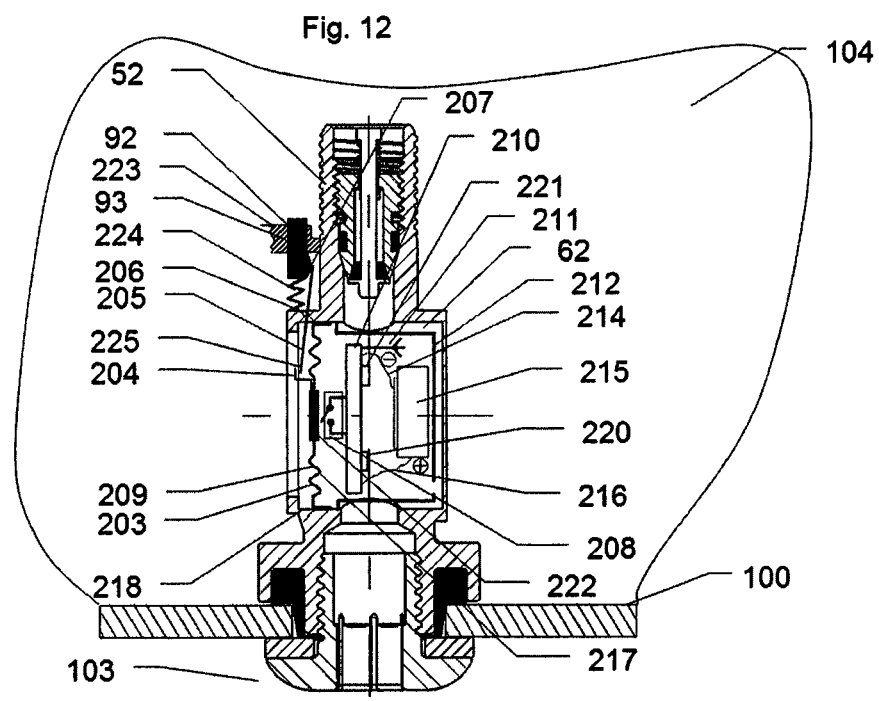
FIG. 12 shows the device of FIG. 6 according to a fifth embodiment of the invention.

FIG. 12 shows a fifth embodiment of the invention, referring to the first embodiment illustrated in FIG. 8.

A support 223 is integral with the body 52 and comprises a cavity 93 within which a slider 92 moves between two limit positions.

A first limit position, distal from the hollow space 62, corresponds to the state of equilibrium of the slider 92 in the absence of external forces, and is held by an elastic element 224 acting on the slider 92 and reacting on the body 52.

A second limit position, proximal to the hollow space 62, is reached when an external force is applied to the slider 92 and overcomes the reaction of the elastic element 224.

A lever 205, whose fulcrum 206 is integral with the body 52, is actuated by the slider 92 it is in contact with in the zone 207.

When the slider is in the first limit position, distal from the hollow space 62, the lever 205 does not interact with any apparatus.

When the slider 92 is pushed by an external force to the second limit position, proximal to the hollow space 62, an extremity 225 of the lever 205 acts on an undercut 204 integral with the elastically deformable partition 203 and pushes the elastically deformable partition 203 towards the outside environment 104.

FIG. 13 shows a sixth embodiment of the invention, referring to the second embodiment illustrated in FIG. 9.

A support 223 is integral with the body 52 and comprises a cavity 93 within which a slider 92 moves between two limit positions.

A first limit position, distal from the hollow space 62, corresponds to the state of equilibrium of the slider 92 in the absence of external forces, and is held by an elastic element 224 acting on the slider 92 and reacting on the body 52.

A second limit position, proximal to the hollow space 62, is reached when an external force is applied to the slider 92 and overcomes the reaction of the elastic element 224.

A lever 205, whose fulcrum 206 is integral with the body 52, is actuated by the slider 92 it is in contact with in the zone 207.

When the slider is in the first limit position, distal from the hollow space 62, the lever 205 does not interact with the apparatuses located in the hollow space 94.

When the slider 92 is pushed by an external force to the second limit position, proximal to the hollow space 62, an extremity 225 of the lever 205 acts on an undercut 204 integral with the elastically deformable partition 203 and pushes the elastically deformable partition 203 towards the wall 80.

FIG. 14 shows a seventh embodiment of the invention, referring to the third embodiment illustrated in FIG. 10.

A support 223 is integral with the body 52 and comprises a cavity 93 within which a slider 92 moves between two limit positions.

A first limit position, distal from the hollow space 62, corresponds to the state of equilibrium of the slider 92 in the absence of external forces, and is held by an elastic element 224 acting on the slider 92 and reacting on the body 52.

A second limit position, proximal to the hollow space 62, is reached when an external force is applied to the slider 92 and overcomes the reaction of the elastic element 224.

A lever 205, whose fulcrum 206 is integral with the body 52, is actuated by the slider 92 it is in contact with in the zone 207.

When the slider is in the first limit position, distal from the hollow space 62, the lever 205 does not interact with the apparatuses located in the hollow space 94.

When the slider 92 is pushed by an external force to the second limit position, proximal to the hollow space 62, an extremity 225 of the lever 205 acts on an undercut 204 integral with the elastically deformable partition 203 and pushes the elastically deformable partition 203 towards the wall 80.

FIG. 15 shows an eighth embodiment of the invention, referring to the fourth embodiment illustrated in FIG. 11.

A support 223 is integral with the body 52 and comprises a cavity 93 within which a slider 92 moves between two limit positions.

A first limit position, distal from the hollow space 62, corresponds to the state of equilibrium of the slider 92 in the absence of external forces, and is held by an elastic element 224 acting on the slider 92 and reacting on the body 52.

A second limit position, proximal to the hollow space 62, is reached when an external force is applied to the slider 92 and overcomes the reaction of the elastic element 224.

A lever 205, whose fulcrum 206 is integral with the body 52, is actuated by the slider 92 it is in contact with in the zone 207.

When the slider is in the first limit position, distal from the hollow space 62, the lever 205 does not interact with the apparatuses located in the hollow space 94.

When the slider 92 is pushed by an external force to the second limit position, proximal to the hollow space 62, an extremity 225 of the lever 205 acts on an undercut 204 integral with the elastically deformable partition 203 and pushes the elastically deformable partition 203 towards the wall 80.

FIG. 16 shows a ninth embodiment of the invention, referring to the fifth embodiment illustrated in FIG. 12.

The apparatuses located in the hollow space 62 comprise at least: a pressure sensor 213; a temperature sensor 219; an accelerometer 226; an information processing apparatus, including related memory 220; an apparatus 221 for generating electromagnetic signals; an apparatus 211 for transmitting electromagnetic signals adapted to transmit information to a receiver; a power supply system 215 (for example, batteries), including related connections 214, 216; a support 210 for reference and connection across the apparatuses and at least one switching device 208 for opening or closing at least one electrical contact connected to the aforesaid apparatuses.

FIG. 17 shows a tenth embodiment of the invention, referring to the sixth embodiment illustrated in FIG. 13.

The apparatuses located in the hollow space 62 comprise at least: a pressure sensor 213; a temperature sensor 219; an accelerometer 226; an information processing apparatus, including related memory 220; an apparatus 221 for generating electromagnetic signals; an apparatus 211 for transmitting electromagnetic signals adapted to transmit information to a receiver; a power supply system 215 (for example, batteries), including related connections 214, 216; a support 210 for reference and connection across the apparatuses and at least one switching device 208 for opening or closing at least one electrical contact connected to the aforesaid apparatuses.

FIG. 18 shows an eleventh embodiment of the invention, referring to the seventh embodiment illustrated in FIG. 14.

The apparatuses located in the hollow space 62 comprise at least: a pressure sensor 213; a temperature sensor 219; an accelerometer 226; an information processing apparatus, including related memory 220; an apparatus 221 for generating electromagnetic signals; an apparatus 211 for transmitting electromagnetic signals adapted to transmit information to a receiver; a power supply system 215 (for example, batteries), including related connections 214, 216; a support 210 for reference and connection across the apparatuses and at least one switching device 208 for opening or closing at least one electrical contact connected to the aforesaid apparatuses.

Figure 19:
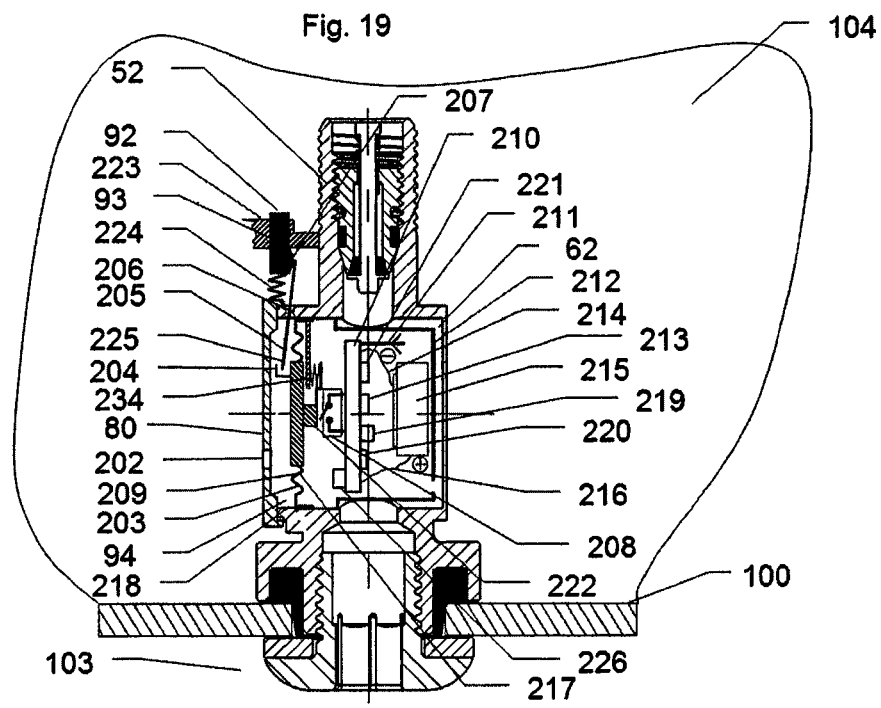
FIG. 19 shows the device of FIG. 6 according to a twelfth embodiment of the invention.

FIG. 19 shows a twelfth embodiment of the invention, referring to the eighth embodiment illustrated in FIG. 15.

The apparatuses located in the hollow space 62 comprise at least: a pressure sensor 213; a temperature sensor 219; an accelerometer 226; an information processing apparatus, including related memory 220; an apparatus 221 for generating electromagnetic signals; an apparatus 211 for transmitting electromagnetic signals adapted to transmit information to a receiver; a power supply system 215 (for example, batteries), including related connections 214, 216; a support 210 for reference and connection across the apparatuses and at least one switching device 208 for opening or closing at least one electrical contact connected to the aforesaid apparatuses.

Figure 20:
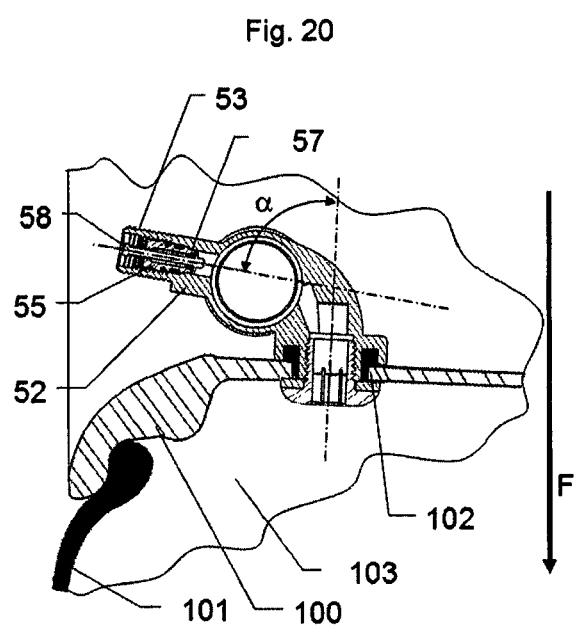
FIG. 20 shows the device of FIG. 6 according to a thirteenth embodiment of the invention.

FIG. 20 shows a thirteenth embodiment of the invention.

The body 52 is shaped in such a way that the axis of its threaded end 53 makes an angle α with the axis of the hole 102. That way, the device according to any of the embodiments of the invention described above can be installed even in configurations where the centrifugal force due to the rotation of the wheel and directed in the same direction as the force F shown in the drawing, might influence the seal of the gasket 57 of the needle 58 of the self-closing valve 55.

Figure 21:
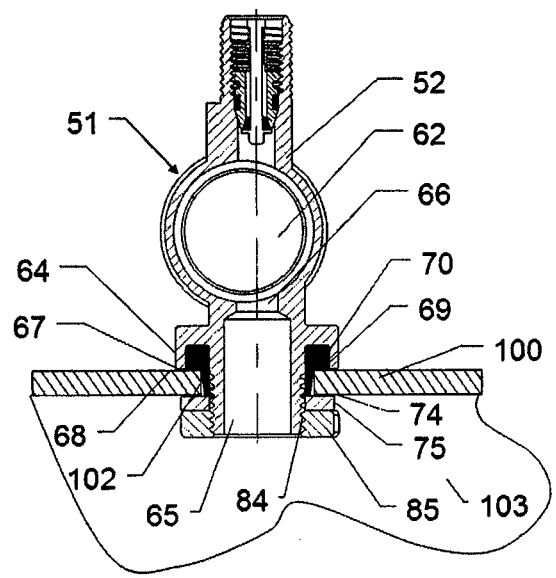
FIG. 21 shows the device of FIG. 6 according to a fourteenth embodiment of the invention.

FIG. 21 shows a fourteenth embodiment of the invention applicable to all the embodiments of the invention described above.

The wall enclosing the cavity 65, in communication with the cavity 62 through the conduit 66, is externally threaded in the stretch 84 which is inserted into the hole 102.

The cavity 62 is in communication with the hollow space 103 through the cavity 65 and thus, the gas contained in the hollow space 103 also fills the cavity 62.

The wall 67 of the flange 64 abuts against the surface 68 formed on the wall of the rim 100 containing the hole 102.

Housings 69 are formed in the flange 64 and are adapted to accommodate gaskets 70 to provide a seal against the gas under pressure inside the hollow space 103.

The threaded stretch 84 engages the internally threaded element 85. The internally threaded element 85 is adapted in shape to be tightened on the surface 74 formed on the wall of the rim 100 containing the hole 102 on the side opposite the surface 68. A gasket 75 is interposed between the surface 74 and the internally threaded element 85.

After inserting the body 52 and the gaskets 70 into the hole 102, the device 51 can be sealingly fastened to the rim 100 by screwing on and tightening the internally threaded element 85 using customary means (for example, the internally threaded element 85 has an end that is suitably shaped to be driven by a spanner).

Figure 22:
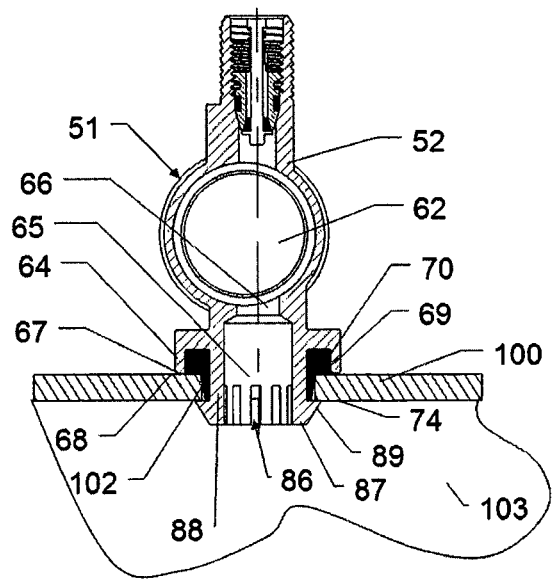
FIG. 22 shows the device of FIG. 6 according to a fifteenth embodiment of the invention.

FIG. 22 shows a fifteenth embodiment of the invention applicable to all the embodiments of the invention described above.

The wall enclosing the cavity 65, in communication with the cavity 62 through the conduit 66, has a profile that is undercut with respect to the hole 102.

A plurality of radial slots 86 delimit a plurality of flexible ends 87 of the wall enclosing the cavity 65 in the stretch 88 to be inserted into the hole 102.

The flexible ends 87 have radial protuberances 89 which make the undercut when they engage with the surface 74 formed on the wall of the rim 100 containing the hole 102 on the side opposite the surface 68.

The cavity 62 is in communication with the hollow space 103 through the cavity 65 and thus, the gas contained in the hollow space 103 also fills the cavity 62.

The wall 67 of the flange 64 abuts against the surface 68 formed on the wall of the rim 100 containing the hole 102.

Housings 69 are formed in the flange 64 and are adapted to accommodate gaskets 70 of known type to provide a seal against the gas under pressure inside the hollow space 103.

After inserting the body 52 and the gaskets 70 into the hole 102, causing the flexible ends 87 to return elastically outwards in a radial direction, the device 51 is sealingly fastened to the rim 100 thanks to the retaining action applied when the surface 74 is engaged by the radial protuberances 89 which make the undercut.

Thus, the device according to the invention preferably comprises: a wall 80 integral with the body 52. The elastically deformable partition 203, which is sealingly connected to the inside wall 218 of the cavity 62, divides the cavity 62 into two hollow spaces 62, 94; the hollow space 62 is in communication with the hollow space 103; a conduit 202, which is formed on the wall 80 or on the part of the wall of the protuberance 61, encloses the hollow space 94 and which places the hollow space 94 in communication with the outside environment 104.

The wall 80 is designed to protect the elastically deformable partition and at the same time maintain the atmospheric pressure of the outside environment on the outside face of the partition itself.

Preferably, the device 51 comprises at least one elastic element 201 interposed between the wall 80 and one face 270 of the contact element 222.

Preferably, the device 51 comprises a wall 231, which is integral with the body 52 and formed on the inside of the cavity 62; said wall 231 acts as a support for at least one elastic element 232 that is interposed between the wall 231 and the partition that is integral with the elastically deformable partition 203; said wall 231 is designed to activate the switching device 208; the connection between the elastic element 232, the wall 231 and the contact element 222 is such that the elastic element 232 can react both by compression and by traction.

Preferably, the device 51 comprises a wall 233. The latter is integral with the body 52 and is formed inside the hollow space 62, and acts as a support for at least one elastic element 234 which is interposed between the wall 233 and an undercut element 235; the undercut element 235 is integral with the contact element 222; the contact element 222, in turn, is integral with the elastically deformable partition 203 and designed to activate the switching device 208.

Preferably, the device 51 comprises a support 223 integral with the body 52 and comprising a cavity 93 within which a slider 92 moves between two limit positions; a first limit position, distal from the hollow space 62, corresponds to the state of equilibrium of the slider 92 in the absence of external forces, and is held by an elastic element 224 acting on the slider 92 and reacting on the body 52; a second limit position, proximal to the hollow space 62, is reached when an external force is applied to the slider 92 and overcomes the reaction of the elastic element 224; a lever 205, whose fulcrum 206 is integral with the body 52, is actuated by the slider 92 it is in contact with in the zone 207; when the slider 92 is in the first limit position, distal from the hollow space 62, the lever 205 does not interact with any apparatus; when the slider 92 is pushed by an external force to the second limit position, proximal to the hollow space 62, an extremity 225 of the lever 205 acts on an undercut 204 integral with the elastically deformable partition 203 and pushes the elastically deformable partition 203 towards the outside environment 104.

The slider constitutes a control element which can be operated from outside the device to move the elastically deformable partition and restore the state of equilibrium of the partition after it has been moved to a position where it touches the switch as a result of an elastic trigger action due to the non-linear properties of the spring connected to the partition (the spring being preferably a Belleville or disc spring). As regards the mode of connecting the device to the wheel rim, the invention contemplates three embodiments, as set out below.

In a first embodiment, the invention provides a device (for monitoring the state of inflation of tyres for vehicle wheels) where the end 99 is integral with a hollow flange 64; a cavity 65 of the end 99 of the body 52 is in communication with the cavity 62 through a conduit 66; a wall 67 of the hollow flange 64 is adapted to constitute a limit stop for abutting against the surface 68 formed on the wall of the rim 100 containing the hole 102; where the flange 64 forms housings 69 which are adapted to accommodate gaskets 70 to provide a seal against the gas under pressure inside the hollow space 103; the cavity 65 has a hollow, internally threaded zone 71 that engages with an externally threaded element 72; the externally threaded element 72 has a head 73 adapted to be tightened on the surface 74 formed on the wall of the rim 100 containing the hole 102 on the side opposite the surface 68; a gasket 75 is interposed between the surface 74 and the head 73, the externally threaded element 72 also has, along its entire length, a cavity 76 which places the cavity 65 in communication with the hollow space 103; that way, the cavity 62 is in communication with the hollow space 103 and the gas contained in the hollow space 103 also fills the cavity 62.

In a second embodiment, the invention provides a device where the end 99 is integral with a hollow flange 64, a cavity 65 of the hollow flange 64 is in communication with the cavity 62 through the conduit 66; the wall enclosing the cavity 65 is externally threaded in the stretch 84 which is inserted into the hole 102; the cavity 62 is in communication with the hollow space 103 through the cavity 65, and thus the gas under pressure in the hollow space 103 also fills the cavity 62; the wall 67 of the hollow flange 64 abuts against the surface 68 formed on the wall of the rim 100 containing the hole 102; housings 69 are formed in the hollow flange 64 and are adapted to accommodate gaskets 70 to provide a seal against the gas under pressure inside the hollow space 103; the threaded stretch 84 engages the internally threaded element 85; the internally threaded element 85 is adapted in shape to be tightened on the surface 74 formed on the wall of the rim 100 containing the hole 102 on the side opposite the surface 68; a gasket 75 is interposed between the surface 74 and the internally threaded element 85; the internally threaded element 85 is suitably shaped to be driven by a spanner for tightening it.

In a third embodiment, the invention provides a device where the wall enclosing the cavity 65, which is in communication with the cavity 62 through the conduit 66, has a profile that is undercut with respect to the hole 102; a plurality of radial slots 86 delimit a plurality of flexible ends 87 of the wall enclosing the cavity 65 in the stretch 88 to be inserted into the hole 102; the flexible ends 87 have radial protuberances 89 which make the undercut when they engage with the surface 74 formed on the wall of the rim 100 containing the hole 102 on the side opposite the surface 68; the cavity 62 is in communication with the hollow space 103 through the cavity 65, and thus the gas under pressure in the hollow space 103 also fills the cavity 62; the wall 67 of the hollow flange 64 abuts against the surface 68 formed on the wall of the rim 100 containing the hole 102; housings 69 are formed in the hollow flange 64 and are adapted to accommodate gaskets 70 to provide a seal against the gas under pressure inside the hollow space 103; the device 51 is sealingly fastened to the rim 100 thanks to the retaining action applied when the surface 74 is engaged by the radial protuberances 89 which make the undercut.

The invention provides a device for monitoring the state of inflation of tyres for vehicle wheel offering the following advantages.

First of all, the overall weight of the wheel with the device according to the invention installed on it is approximately equal (differing by just a few grams) to the overall weight of the wheel prior to installation of the device according to the invention, and without having to compensate the weight of the rim or tyre.

This advantage is made possible by the innovative pressure alarm indication system based on a mechanical sensor (the elastically deformable partition which acts on an electrical contact to activate the indicator), allowing a very small battery to be used. In effect, the electronic components of the device are active only when required (and that is, when the mechanical sensor detects an incorrect state of inflation).

This has an added advantage and that is, the fact that after installation of the monitoring device, it is not necessary to balance the wheel (because the weight of the device is negligible for balancing purposes).

Another advantage lies in the fact that installation of the monitoring device does not add to the inside of the tyre any structure larger than that of an ordinary inflation valve. That is because the device is located inside the inflation valve, or constitutes the inflation valve itself, and is therefore located outside the tyre.

A further advantage, due to the device being built into the inflation valve, and enhanced by the fact that the overall dimensions of the device are extremely reduced (since the first end is at a predetermined angle to the second end, for example between 30 and 80 degrees) is that installation of the monitoring device makes it possible to meet the specification requiring tyre structure not to protrude outside the profile defined by the outer edge of the wheel rim.

A yet further advantage, associated with the features just mentioned, is that installation of the device does not require making any holes in the wheel rim other than the one for the ordinary inflation valve.

Yet another advantage is that the device is very simple and inexpensive to make. In effect, all the components necessary for the device to function (mechanical, electrical and pneumatic components) are housed in the body of the device, that is to say, they are built into the device. That means the device need not be made up of two or more functional modules connected to each other by removable mechanical, electrical or pneumatic interfaces.

Thus, the device according to the invention achieves all the aforementioned aims and offers all the advantages just listed thanks to the fact that it comprises, amongst others, the following features.

The monitoring device is built into the inflation valve.

The monitoring device as a whole is the same in weight as a customary inflation valve, has dimensions compatible with the space in the wheel rim for housing the customary inflation valve and its axial length is not greater than that of the valve itself, so it can be applied to all types of wheels for all existing vehicle types.

The monitoring device does not have removable mechanical, electrical or pneumatic interfaces (making the device particularly dependable and secure against risks of tampering or theft).

The invention claimed is:

1. A device (51) for monitoring the state of inflation of vehicle wheel tyres, the wheels comprising a rim (100) and a respective tyre (101) delimiting a hollow space (103) inside the wheel from the outside environment (104), the device (51) comprising:
    a first end (53) equipped with a self-closing valve connectable to means for inflating and deflating the tyre (101);
    a second end (99) sealingly connectable on a hole (102) in the rim (100) of the wheel;
    a cavity (62) interposed between the two ends (53) and (99) and sealingly delimited by a wall (81) which is integral with a body (52) of the device and by an elastically deformable partition (203) having an inside face subjected to the pressure inside the tyre and an outside face subjected to the atmospheric pressure of the outside environment, characterized in that it, comprises:
    means (221) for generating and transmitting electromagnetic signals and a power source (215);
    a switch (208) mounted in the cavity (62) and configured to drive the means (221) for generating and transmitting electromagnetic signals,
    where the deformable partition (203) comprises a contact element (222) operating on the switch (208) in such a way as to activate it in response to a deformation of the partition (203) itself.

2. The device (51) according to claim 1, the device (51) comprising a body (52) having:
    the first end (53) connectable to means for inflating and deflating the tyre (101), the end (53) defining a cavity (59) which is separated from the outside environment (104) by a self-closing valve (55);
    the second end (99) comprising means for sealingly fastening the device (51) on a hole (102) in the rim (100);
    a hollow protuberance (61) interposed between the two ends (53) and (99) and defining a cavity (62) which is delimited by a wall (81) that is integral with the body (52) and by an elastically deformable partition (203) that is sealingly connected to an inside wall (218) of the cavity (62), the cavity (62) of the protuberance (61) being in communication with the inside hollow space (103) and with the cavity (59), comprising means for processing and transmitting information to a receiver mounted in a vehicle and housed inside the cavity (62) of the hollow protuberance (61), where the means comprise a processor, a memory (220), means (221) for generating and transmitting electromagnetic signals, a power source (215), a switch (208) configured to open and close at least one electrical contact for driving the means (221) for generating and transmitting electromagnetic signals, and a contact element (222) associated with the elastically deformable partition (203) to activate the switch (208) in response to a deformation of the partition (203) itself.

3. The device according to claim 1, comprising a wall (80) integral with the body (52) and interposed between the elastically deformable partition (203) and the outside environment (104) to define a hollow space (94) between the wall (80) and the elastically deformable partition (203) and in communication with the outside atmosphere.

4. The device according to claim 1, comprising an elastic element (201, 232, 234) connected to the elastically deformable partition (203), to apply a predetermined force opposing the pressure applied to the partition (203) and resulting from the difference between the pressure inside the tyre and the atmospheric pressure of the outside environment.

5. The device according to claim 4, wherein the elastic element (201, 232) is connected to a wall (80, 231, 233) which is integral with a body (52) of the device.

6. The device according to claim 4, wherein the elastic element (201, 232, 234) is made of an elastic material with non-linear properties and is configured to trigger an elastic action when the force applied to it reaches a predetermined value, whereby the switch (208), in combination with the partition (203), forms a mechanical switch of the open/closed type.

7. The device according to claim 4, wherein the elastic element (201, 232, 234) is made from bimetallic material.

8. The device according to claim 1, comprising a slider (92) movable between limit positions and accessible from the outside of the device so it can be moved, the slider (92) being operatively connected to the elastically deformable partition (203) to cause the latter to move towards the outside environment (104) in response to a movement of the slider (92).

9. The device according to claim 1, comprising, inside the cavity (62):
an accelerometer (226);
a pressure sensor (213) and/or a temperature sensor (219).

10. The device according to claim 1, wherein the elastically deformable partition (203) is made from bimetallic material.

11. The device according to claim 1, wherein the switch (208) is of the normally open contact type, so that the movement of the partition (203) in response to a reduction in tyre pressure below a predetermined value causes the switch to close, thereby driving the means (221) for generating and transmitting electromagnetic signals.

12. The device according to claim 1, wherein the body (52) of the device is made from polymeric material to avoid interferences with the means (221) for generating and transmitting electromagnetic signals.

13. The device according to claim 1, comprising a protective non-sealing partition (212) located inside the cavity (62) to protect electronic components inside the cavity from direct gas flows during tyre inflation, while maintaining inside the cavity (62) the same pressure as the pressure (103) inside the tyre.

14. The device according to claim 1, wherein the body (52) is shaped in such a way that the axis of the first end (53) and the axis of the second end (99) make an angle α different from zero.

15. The device according to claim 2, comprising, inside the cavity (62):
an accelerometer (226);
a pressure sensor (213) and/or a temperature sensor (219).

16. The device according to claim 2, wherein the elastically deformable partition (203) is made from bimetallic material.

17. The device according to claim 3, wherein the elastically deformable partition (203) is made from bimetallic material.

18. The device according to claim 4, wherein the elastically deformable partition (203) is made from bimetallic material.

19. The device according to claim 9, wherein the elastically deformable partition (203) is made from bimetallic material.

20. The device according to claim 6, wherein the switch (208) is of the normally open contact type, so that the movement of the partition (203) in response to a reduction in tyre pressure below a predetermined value causes the switch to close, thereby driving the means (221) for generating and transmitting electromagnetic signals.

\* \* \* \* \*